United States Patent
Ueda et al.

(10) Patent No.: US 12,555,451 B2
(45) Date of Patent: Feb. 17, 2026

(54) ITEM MANAGEMENT SYSTEM, ITEM MANAGEMENT METHOD, ITEM DETECTION INSTRUMENT, AND ITEM DETECTION DEVICE

(71) Applicant: SATO HOLDINGS KABUSHIKI KAISHA, Tokyo (JP)

(72) Inventors: Yoshiyuki Ueda, Tokyo (JP); Mitsutoshi Sakagami, Tokyo (JP)

(73) Assignee: SATO CORPORATION, Tokyo (JP)

( * ) Notice: Subject to any disclaimer, the term of this patent is extended or adjusted under 35 U.S.C. 154(b) by 0 days.

(21) Appl. No.: 18/837,362

(22) PCT Filed: Feb. 21, 2023

(86) PCT No.: PCT/JP2023/006255
§ 371 (c)(1),
(2) Date: Aug. 9, 2024

(87) PCT Pub. No.: WO2023/162984
PCT Pub. Date: Aug. 31, 2023

(65) Prior Publication Data
US 2025/0037559 A1    Jan. 30, 2025

(30) Foreign Application Priority Data
Feb. 28, 2022  (JP) .............................. 2022-030367

(51) Int. Cl.
*G08B 13/24* (2006.01)
*G06Q 10/087* (2023.01)

(52) U.S. Cl.
CPC ....... *G08B 13/2462* (2013.01); *G06Q 10/087* (2013.01)

(58) Field of Classification Search
CPC .......................... G08B 13/2462; G06Q 10/087
See application file for complete search history.

(56) References Cited

U.S. PATENT DOCUMENTS 6,008,727 A * 12/1999 Want .................. G06K 7/10079
340/572.1
6,176,425 B1 * 1/2001 Harrison .......... G06K 19/07327
235/383

(Continued)

FOREIGN PATENT DOCUMENTS

CN     111597843 A     8/2020
JP     2009-100952 A   5/2009

(Continued)

OTHER PUBLICATIONS

Extended European Search Report issued in EP Appl. No. 23759987.3 dated Mar. 27, 2025.

(Continued)

*Primary Examiner* — Hoi C Lau
(74) *Attorney, Agent, or Firm* — Foley & Lardner LLP

(57) ABSTRACT

An item management system includes: a placement member for placing an item, the placement member being at a first position when no item is placed on the placement member, the placement member moving from the first position to a second position when an item is placed on the placement member; a communication device attached to the placement member; a radio wave shield member configured to shield radio waves emitted from the communication device when the radio wave shield member is close to the communication device; a wireless device wirelessly communicating with the communication device; and a control device that acquires a result of whether communication by the wireless device with the communication device is possible, and determines whether the item is placed on the placement member, based on the result of whether the communication is possible.

16 Claims, 9 Drawing Sheets

(56) References Cited

U.S. PATENT DOCUMENTS

| | | | | |
|---|---|---|---|---|
| 6,249,226 | B1* | 6/2001 | Harrison | G06K 7/0008 |
| | | | | 340/10.6 |
| 6,340,931 | B1* | 1/2002 | Harrison | G06K 19/0723 |
| | | | | 340/5.2 |
| 6,342,830 | B1* | 1/2002 | Want | G06K 19/0717 |
| | | | | 343/873 |
| 6,446,208 | B1* | 9/2002 | Gujar | G06K 7/0008 |
| | | | | 713/184 |
| 7,598,868 | B2* | 10/2009 | Lee | G08B 13/2402 |
| | | | | 200/61.93 |
| 7,719,425 | B2* | 5/2010 | Colby | G06K 19/07327 |
| | | | | 340/572.1 |
| 7,838,844 | B2* | 11/2010 | Wagner | G21G 4/08 |
| | | | | 250/252.1 |
| 7,948,381 | B2* | 5/2011 | Lindsay | G06K 19/07345 |
| | | | | 340/539.11 |
| 7,950,585 | B2* | 5/2011 | Skowronek | G06K 19/07327 |
| | | | | 235/492 |
| 8,400,270 | B2* | 3/2013 | Brand | F16D 66/00 |
| | | | | 455/344 |
| 8,487,769 | B2* | 7/2013 | Lindsay | G06K 19/07767 |
| | | | | 340/539.11 |
| 9,524,458 | B2* | 12/2016 | Colby | G06K 19/07345 |
| 9,569,777 | B2* | 2/2017 | Colby | G06K 7/10316 |
| 10,037,449 | B1* | 7/2018 | Hahn | G06K 19/0707 |
| 10,089,505 | B1* | 10/2018 | Huebner | G06K 7/10415 |
| 10,262,172 | B1* | 4/2019 | Niranjayan | G06K 7/10326 |
| 10,417,462 | B2* | 9/2019 | Colby | G06Q 20/3278 |
| 10,417,463 | B2* | 9/2019 | Colby | G06Q 20/3278 |
| 10,621,528 | B2* | 4/2020 | Dong | G06Q 10/06315 |
| 10,650,199 | B2* | 5/2020 | Colby | G06K 7/10158 |
| 10,956,689 | B2* | 3/2021 | Colby | G06Q 20/327 |
| 11,347,949 | B2* | 5/2022 | Colby | G07G 1/009 |
| 11,599,762 | B2* | 3/2023 | Oishi | G07G 1/009 |
| 12,333,483 | B2* | 6/2025 | Okabe | G06Q 10/0838 |
| 2006/0187055 | A1* | 8/2006 | Colby | G06K 19/07749 |
| | | | | 343/841 |
| 2006/0187060 | A1* | 8/2006 | Colby | H01Q 1/526 |
| | | | | 343/841 |
| 2006/0187061 | A1* | 8/2006 | Colby | H01Q 1/22 |
| | | | | 343/841 |
| 2006/0220858 | A1* | 10/2006 | Kawamata | G01R 31/2822 |
| | | | | 340/572.1 |
| 2007/0063847 | A1* | 3/2007 | Lee | G08B 13/2402 |
| | | | | 340/572.1 |
| 2007/0152829 | A1* | 7/2007 | Lindsay | G06K 19/07345 |
| | | | | 340/10.2 |
| 2007/0247315 | A1 | 10/2007 | Nagai et al. | |
| 2008/0265039 | A1* | 10/2008 | Skowronek | G06K 19/07327 |
| | | | | 235/492 |
| 2009/0072949 | A1* | 3/2009 | Fukuda | H01Q 7/00 |
| | | | | 343/893 |
| 2009/0167502 | A1* | 7/2009 | Erickson | G06K 7/0008 |
| | | | | 340/572.1 |
| 2009/0231097 | A1* | 9/2009 | Brand | G06K 7/0008 |
| | | | | 340/10.1 |
| 2010/0013603 | A1* | 1/2010 | Chatani | G06Q 30/02 |
| | | | | 340/10.6 |
| 2011/0254665 | A1* | 10/2011 | Lindsay | G06K 19/07345 |
| | | | | 340/10.5 |
| 2012/0025988 | A1 | 2/2012 | Harada | |
| 2012/0299703 | A1* | 11/2012 | Chen | G06K 19/0722 |
| | | | | 235/375 |
| 2016/0086005 | A1 | 3/2016 | Hattori | |
| 2017/0213173 | A1* | 7/2017 | Dong | G06Q 10/06315 |
| 2019/0138766 | A1* | 5/2019 | Colby | G06Q 20/4012 |
| 2019/0244069 | A1* | 8/2019 | Oishi | G06Q 20/3278 |
| 2020/0302257 | A1* | 9/2020 | Oishi | G06K 19/0723 |
| 2022/0051066 | A1* | 2/2022 | Oishi | G06K 7/0008 |
| 2022/0309458 | A1* | 9/2022 | Okabe | G06Q 50/04 |
| 2024/0046052 | A1 | 2/2024 | Sakagami | |
| 2025/0037559 | A1* | 1/2025 | Ueda | G08B 13/2462 |
| 2025/0193642 | A1* | 6/2025 | Ueda | G06Q 30/0201 |

FOREIGN PATENT DOCUMENTS

| | | |
|---|---|---|
| JP | 2009-242058 A | 10/2009 |
| JP | 2009-289099 A | 12/2009 |
| JP | 2010-145328 A | 7/2010 |
| JP | 2010-207376 A | 9/2010 |
| JP | 2017-128938 A | 7/2017 |
| JP | 2020-194580 A | 12/2020 |
| JP | 2021-149218 A | 9/2021 |
| WO | WO-2006/011215 A1 | 2/2006 |
| WO | WO-2010/104066 A1 | 9/2010 |
| WO | WO-2014/132621 A1 | 9/2014 |
| WO | WO-2022/209329 A1 | 10/2022 |

OTHER PUBLICATIONS

Extended European Search Report issued in EP Appl. No. 23759985.7 dated Mar. 27, 2025.

* cited by examiner

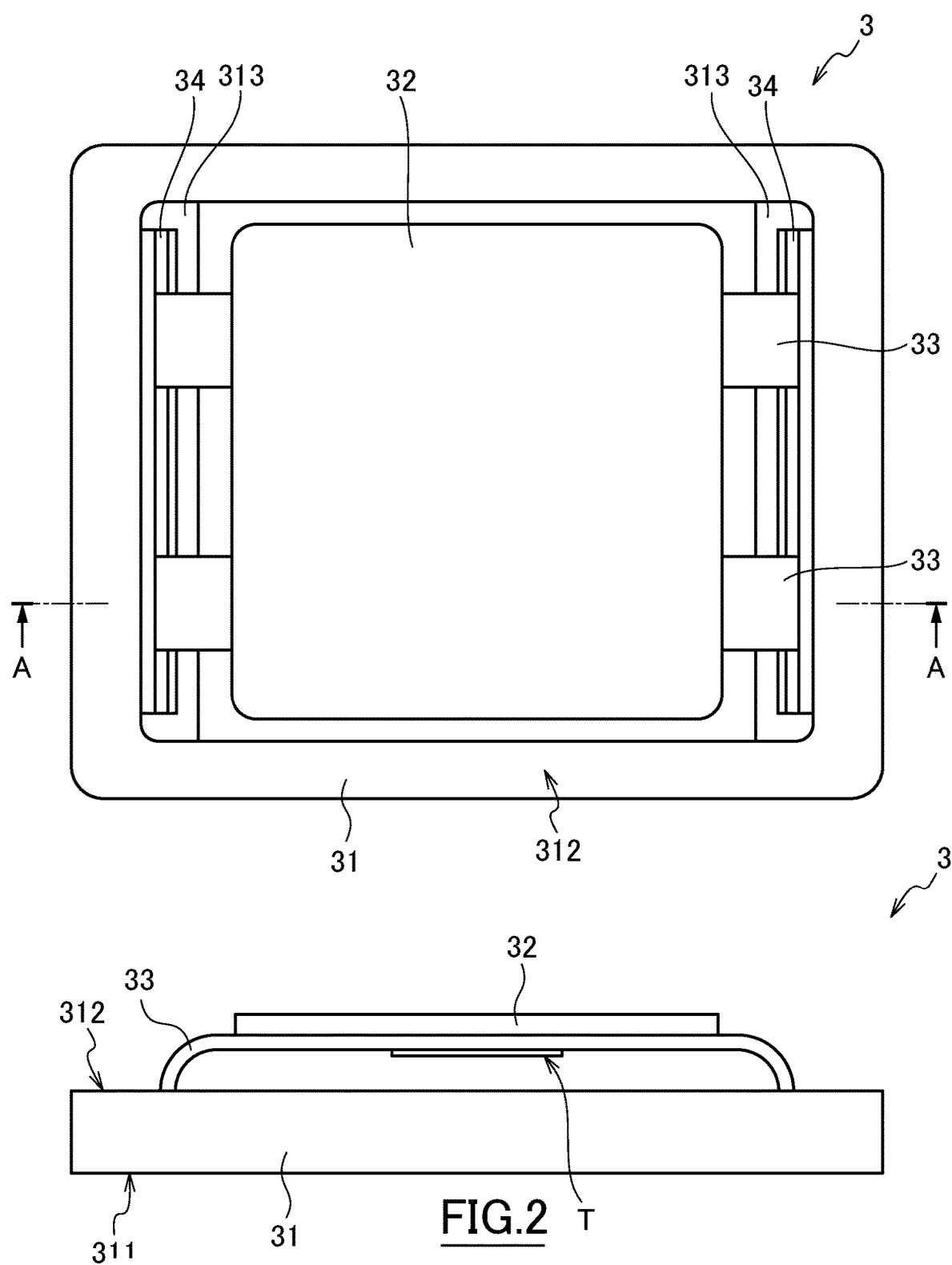

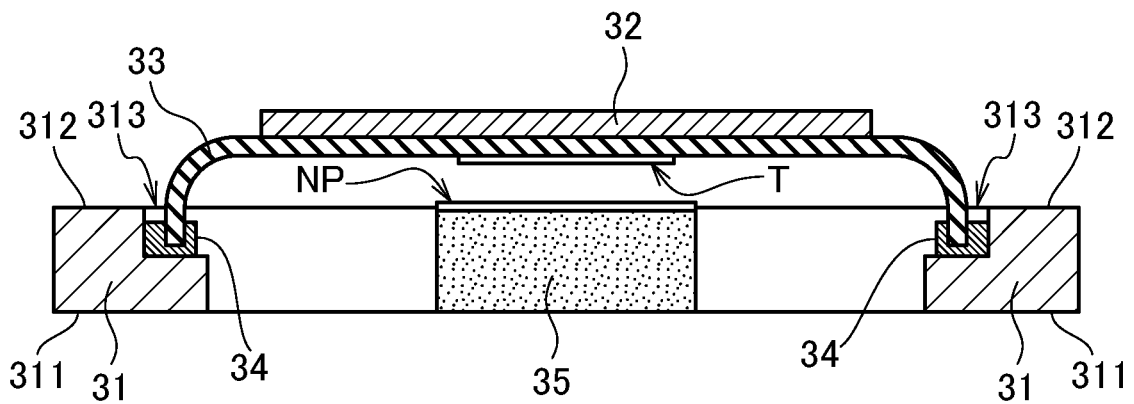
STATE WHERE PRODUCT IS NOT PLACED
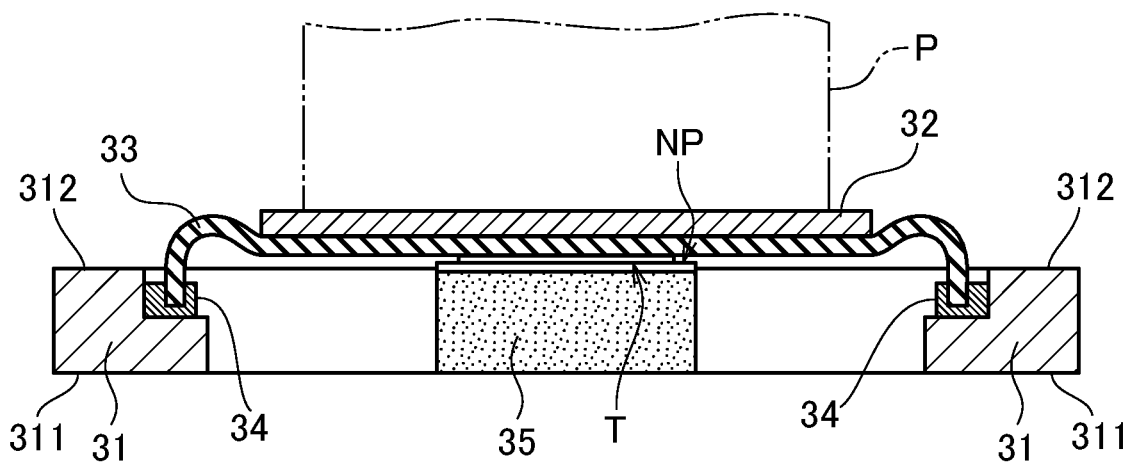
FIG.3      STATE WHERE PRODUCT IS PLACED

| TAG ID | PRODUCT CODE | POSITION |
|---|---|---|
| 01 | ABC | A1 |
| 02 | ABC | A2 |
| 03 | ABC | B1 |
| 04 | ABC | B2 |
| ⋮ | ⋮ | ⋮ |

TAG DATABASE

FIG.6

ITEM MANAGEMENT SYSTEM, ITEM MANAGEMENT METHOD, ITEM DETECTION INSTRUMENT, AND ITEM DETECTION DEVICE

FIELD

The present invention relates to an item management system, an item management method, an item detection instrument, and an item detection device.

BACKGROUND

It is conventionally proposed an item management system in which items are associated with wireless tags to manage stock of the items.

For example, Japanese Patent Application Laid-Open Publication No. 2009-242058 describes a stock management system that are constituted by an IC tag, a reading device, and a movement device. The reading device reads signals from IC tags attached to items placed on a shelf. Thereby, based on the read signals, the stock management system recognizes what items are placed on a shelf.

BRIEF SUMMARY

Technical Problem

Incidentally, in a case of stock management and product supply at a store front in a retail store such as a supermarket, conventionally, a retail store staff in charge visually checks the number of displayed products, and supplies products, depending on necessity. This work has a disadvantage of needing a staff and lacking accuracy. In a case of attempting stock management in a retail store by attaching an IC tag to each product as in the conventional stock management system, an IC tag needs to be attached to every product. As a result, cost is undesirably increased.

In view of the above, an object of the present invention is to be able to recognize presence or absence of an item without a communication device attached to the item.

Solution To Problem

An aspect of the present invention provides an item management system including:
  a placement member for placing an item, the placement member being at a first position when no item is placed on the placement member, the placement member moving from the first position to a second position when an item is placed on the placement member;
  a communication device attached to the placement member;
  a radio wave shield member configured to shield radio waves emitted from the communication device when the radio wave shield member is close to the communication device;
  a wireless device wirelessly communicating with the communication device; and
  a control device that acquires a result of whether communication by the wireless device with the communication device is possible, and determines whether the item is placed on the placement member, based on the result of whether the communication is possible, wherein
when the placement member is at the first position, the communication device is separated from the radio wave shield member, and when the placement member is at the second position, the communication device is close to the radio wave shield member.

Advantageous Effects

According to an aspect of the present invention, presence or absence of an item can be recognized without a communication device attached to the item.

BRIEF DESCRIPTION OF DRAWINGS

FIG. 2 illustrates a plan view and a front view of a product detection instrument according to one embodiment FIG. 3 illustrates a state where a product is not placed and a state where a product is placed, concerning the A-A section in FIG. 2.

FIG. 6 illustrates a data configuration example of a tag database.

DETAILED DESCRIPTION

Figure 1:
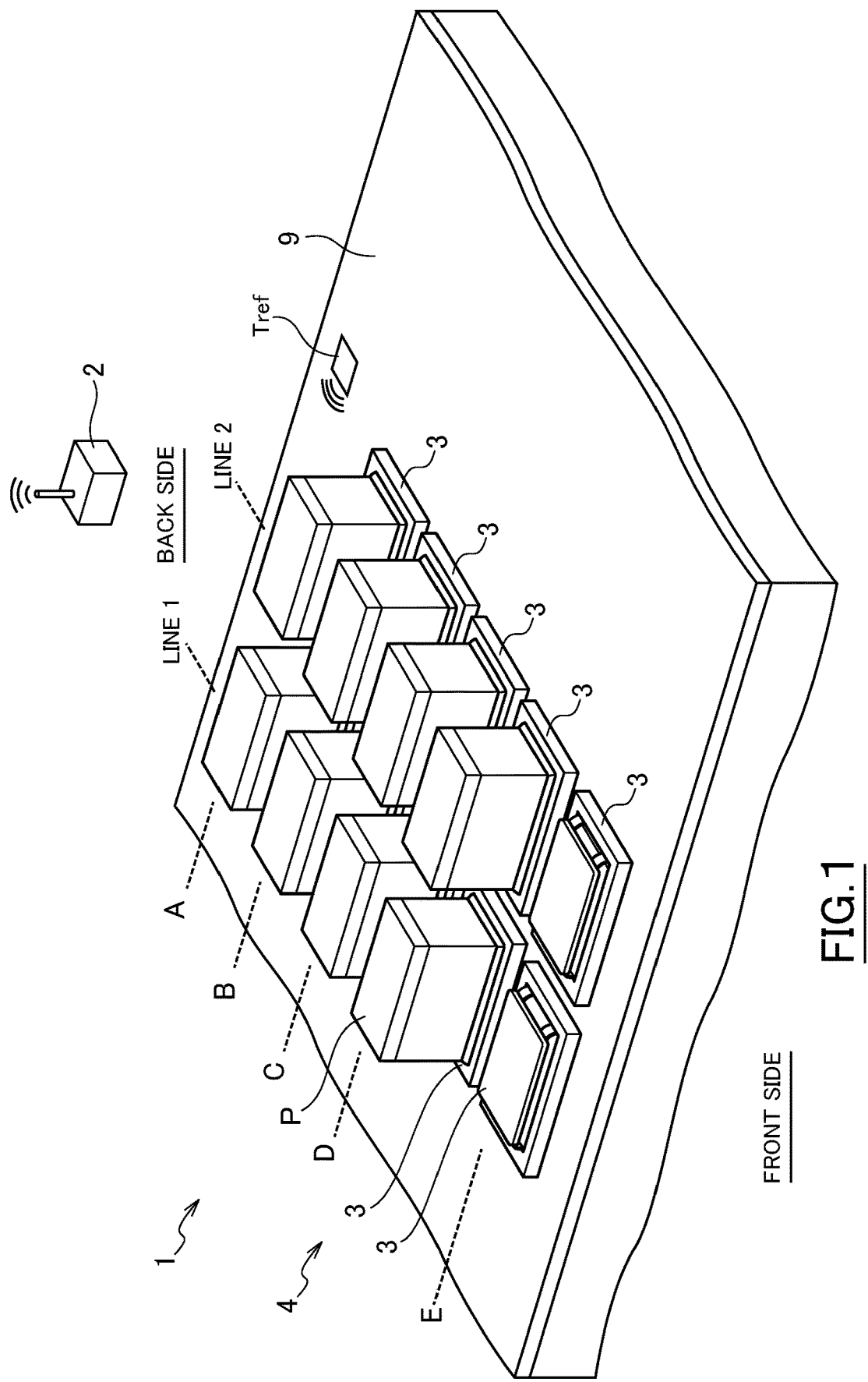
FIG. 1 illustrates an arrangement example of a product management device according to one embodiment.

In the present disclosure, "item" means a tangible object such as a product, a manufactured article, a semi-manufactured article (an article at an intermediate stage in course of being manufactured), or a mock-up. One example of an item cited in the following embodiment is a selling-target product in a store.

The following describes a product management system that is one embodiment of an item management system according to the present disclosure.

The product management system according to the one embodiment is configured in such a way that when products are displayed in a store, a store staff in charge can recognize how many products remain unsold and where these unsold products exist, even though the store staff in charge is not at the site.

The products are, but not limited to, preferably ones arranged in a matrix. Examples of the applicable product widely include a box-shaped product such as a powder detergent, and a bottle-shaped product such as a laundry softener, a liquid detergent, a shampoo, or a conditioner.

A product detection instrument (one example of an item detection instrument) is used in order to detect whether the product are present (remains). In one embodiment, the one product detection instrument is used for the single product. The product is set for sale in a state where the product is placed on this product detection instrument. When a customer acquires (purchases) the product, the product is removed from the product detection instrument. Whether the product is placed on the product detection instrument is detected by each of the product detection instruments. Thereby, an unsold state of the products at the store front can be determined. Thus, the system can be configured to notify, at an appropriate timing, the store staff in charge of whether products need to be supplied.

The product detection instrument according to the one embodiment includes a communication device. A wireless device for communicating with the communication device is arranged within a communicable range of the communication device.

The product detection instrument is configured in such a way that, when the product is placed on the product detection instrument, a position of the communication device is displaced downward in the vertical direction by a weight of the product, and thereby, the communication device becomes unable to emit radio waves. For example, when the communication device is displaced, the communication device comes into contact with a sheet member including a metal coating. Thereby, an electromagnetic shielding function of the sheet member prevents the communication device from emitting radio waves, and the wireless device becomes unable to receive a signal from the communication device. Accordingly, it can be determined whether the product is placed on the product detection instrument, based on whether the wireless device can receive a signal from the communication device provided in the product detection instrument.

The communication device is preferably an IoT tag (one example of a wireless tag) from a standpoint of being usable for a long term without maintenance. The IoT tag collects surrounding radio waves and converts the collected radio waves into electric power, and includes a capacitor storing the electric power. However, the communication device is not limited to this, and may be an RFID tag (one example of the wireless tag). The RFID tag operates in the UHF band, the HF band, or the microwave band. In each of these cases, the RFID tag may be a passive type (one that does not include an incorporated battery) or an active type (one that includes an incorporated battery).

In the product management system according to the one embodiment, when the product is not placed on the product detection instrument and thus, the wireless device can communicate with the communication device, the wireless device receives identification information (e.g., a tag ID described below) identifying the communication device, and notifies the server of the received identification information via a network. Thereby, the server can determine that the product is not placed on the product detection instrument provided with the communication device associated with the identification information. Even when a plurality of the products of the same product code are arranged in a matrix, the server can individually recognize whether the product exists, for each of the products. Thus, the server can provide, to a store staff in charge, visually recognizable information of positions of the already-sold products and the unsold products.

The following more specifically describes the product management system 1 according to the one embodiment.

FIG. 1 illustrates one example of the products P and a product management device 4 in a state where the products P are arranged in a matrix in the store.

In the example illustrated in FIG. 1, a plurality of the products P are arranged on a product shelf located between a front passage and a rear passage. In a configuration of this example, the ten products P can be arranged in two lines and in five rows. When the lines are represented by 1 and 2, and the rows are represented by A to E, the products P can be placed at ten positions A1, A2, B1, B2, C1, C2, D1, D2, E1, and E2.

The product management device 4 (one example of an item detection device) includes the ten product detection instruments 3 in 2×5 arrangement associated with the arrangement of the products.

In a state of the example illustrated in FIG. 1, the products P at the positions E1 and E2 have been sold and do not exist, and the other eight products P remain unsold and still exist.

Next, a structure of the product detection instrument 3 is described with reference to FIG. 2 and FIG. 3. The product detection instrument 3 is an instrument for detecting whether the arranged product P exists at the associated position.

FIG. 2 illustrates a plan view and a front view of the product detection instrument 3 according to the one embodiment. FIG. 3 illustrates, concerning the A-A section in FIG. 2, a state where the product P is not placed on the product detection instrument 3 and a state where the product P is placed on the product detection instrument 3.

Referring to FIG. 2, the product detection instrument 3 includes a frame 31, a placement member 32, an elastic member 33, and a holding portion 34. The frame 31, the placement member 32, and the holding portion 34 are formed of resin such as plastic, wood, or paper, for example, but there is no limitation to these.

The frame 31 is a base for being placed on the product shelf. In one example, as illustrated in FIG. 2, the frame 31 includes a rectangular or square outer edge, and is shaped in such a way as not to overlap with the placement member 32 in a plan view. The frame 31 includes a bottom surface 311 and an upper surface 312. The bottom surface 311 is a surface that contacts with the product shelf 9.

As illustrated in FIG. 2 and FIG. 3, an inner edge of the frame 31 includes a pair of mutually facing sides at each of which a step 313 is formed. The step 313 is one step lower than the upper surface 312. The holding portions 34 are fixed to the steps 313. Although the fixing method is not particularly limited, the fixing is made by an adhesive, for example.

As illustrated in FIG. 3, the holding portions 34 each have a U-shaped section and hold both ends of the elastic member 33 in such a way that the elastic member 33 traverses between a pair of the mutually facing sides of the inner edge of the frame 31. The elastic member 33 may be press-fitted into the holding portions 34 each having the U-shaped section, or may be fixed to the holding portions 34 by an adhesive.

The elastic member 33 is an elongated leaf spring made of natural rubber or synthetic rubber, for example. In the example illustrated in FIG. 2, the two elastic members 33 are attached. However, there is no limitation to this. The number, a size, or a material of the elastic members 33 is appropriately determined in such a way as to have an elastic property responsive to a weight of the product placed on the placement member 32.

The placement member 32 for placing the item is attached to an upper surface of the elastic member 33. The placement member 32 is a flat plate that is rectangular or square. The placement member 32 is stuck to the elastic member 33 by double-sided tape or an adhesive, for example. As illustrated in FIG. 3, the elastic member 33 is configured to bend downward in the vertical direction when the product P is placed on the placement member 32.

As illustrated in FIG. 3, an Internet-of-things (IOT) tag T (one example of the communication device) is attached to a lower surface of the elastic member 33, near the center of the lower surface of the elastic member 33. The IoT tag is one example of an energy-harvesting communication device that generates electric power based on radio waves in a surrounding environment. The IoT tag does not include a battery.

The maximum communication distance of the tag T is, but not limited to, a value in a range from 3 meters to 10 meters, for example. The tag T is configured to make wireless communication with low electric power consumption. Examples of a communication protocol for the tag T include Bluetooth (registered trademark) Low Energy (hereinafter, BLE), Bluetooth (registered trademark), and ZigBee (registered trademark). The following describes an exemplified case where the communication is made by BLE.

When the tag T is based on the standard of BLE, the tag T broadcasts an advertising packet (described below) at a predetermined interval (e.g., every short period of approximately 1 second to approximately 10 seconds). The packet transmitted by the tag T includes the tag ID that is identification information of the tag.

As illustrated in FIG. 1, the wireless device 2 for making BLE communication with the tag T is placed near the product shelf 9. As described below, the wireless device 2 is a gateway device that can communicate with a tag management server (described below) via a network. The wireless device 2 is arranged at a position where the wireless device 2 can receive the packet transmitted from the tag T attached to the product detection instrument 3 on which the product P is not placed. In other words, the wireless device 2 is arranged by taking into consideration a radio wave output of the tag T.

An installation location of the wireless device 2 may be set arbitrarily without being limited to the position illustrated in the drawing.

As illustrated in FIG. 3, a metal-deposited sheet NP is arranged on a vertical-direction lower side of the tag T attached to the elastic member 33. The metal-deposited sheet NP is positioned at a predetermined height in relation to the bottom surface 311 of the frame 31. A spacer having the predetermined height may be provided on the product shelf in order to arrange the metal-deposited sheet NP at the predetermined height.

The metal-deposited sheet NP (one example of a sheet member) includes a transparent PET film, an aluminum vapor deposition layer (coating) (one example of a metal coating), and an adhesive that are layered on each other in this order. The metal-deposited sheet NP is attached to an upper surface of a cushion 35 with the adhesive. A foil sheet having curved-surface conformability may be used instead of the metal-deposited sheet NP. Instead of this, a metal plate, a radio wave absorbing sheet, or a sheet including a coating into which metal powder or magnetic powder is mixed can also be used.

In a preferred example illustrated in FIG. 3, a cushion 35 such as a sponge is provided as the spacer, and the metal-deposited sheet NP is arranged on the cushion 35. In other words, the cushion 35 is arranged on a lower side of the metal-deposited sheet NP in such a way as to prevent the tag T or the metal-deposited sheet NP from being damaged when the product P is placed on the placement member 32, the elastic member 33 bends in the vertical direction, and the tag T attached to the lower surface of the elastic member 33 comes into contact with the metal-deposited sheet NP directly under the tag T. Providing the cushion 35 reduces the impact when the tag T comes into contact with the metal-deposited sheet NP.

As illustrated in FIG. 3, in a state where the product P is not placed on the placement member 32, the elastic member 33 hardly bends downward in the vertical direction, and thus, a gap is maintained between the tag T attached to the lower surface of the elastic member 33 and the metal-deposited sheet NP directly under the tag T. In this state, radio wave emission performance of the tag T is not degraded, and thus, the wireless device 2 can receive a packet transmitted from the tag T without a problem.

Meanwhile, in a state where the product P is placed on the placement member 32, the elastic member 33 on a lower side of the placement member 32 bends downward in the vertical direction. Thereby, the tag T attached to the lower surface of the elastic member 33 comes into contact with the metal-deposited sheet NP directly under the tag T. Accordingly, the aluminum vapor deposition layer included in the metal-deposited sheet NP shields radio waves emitted from the tag T, and thus, the radio wave emission performance of the tag T is significantly degraded. As a result, the wireless device 2 becomes unable to receive a packet transmitted from the tag T, or receives, at a significantly reduced frequency, a packet transmitted from the tag T.

In this manner, the product detection instrument 3 enables detection of whether the associated product P is placed on the product detection instrument 3.

FIG. 2 illustrates, as an example, the product detection instrument 3 having the rectangular or square shape in the plan view. However, a shape of the product detection instrument is not limited to this, and can be an arbitrary shape such as a circle, an ellipse, or a polygon. It is preferable that when the product is placed on the placement member having an arbitrary shape, the placement member bends downward in the vertical direction so that the tag T and the metal-deposited sheet NP come into contact with each other. Thus, shapes of the placement member and the frame of the product detection instrument are not essential.

The product detection instrument 3 illustrated in FIG. 2 is an example in which the leaf spring made of a rubber material is applied as the elastic member 33. However, the elastic member is not limited to this, and a coil spring can also be applied as the elastic member. In this case, a bottom plate that contacts with the product shelf 9 is provided at the frame, and the coil spring is arranged between the bottom plate and the placement member 32.

As illustrated in FIG. 1, a reference tag Tref is preferably placed on the product shelf 9. The reference tag Tref is a tag for reference, and is a device having the same configuration as that of the tag T.

The reference tag Tref may be arranged at any location as long as the reference tag Tref can communicate with the wireless device 2 regardless of whether the products "P" are placed on the associated product detection instruments 3. The reference tag Tref is provided for determining whether the wireless device 2 is operating normally. Particularly, when the products "P" are placed on all of the product detection instruments 3, the wireless device 2 cannot receive any of radio waves emitted from the tags T of all of the product detection instruments 3, and thus, it is difficult to determine whether the system is operating normally, if the reference tag Tref is not provided. In view of it, the reference tag Tref that can communicate with the wireless device 2 regardless of whether the products "P" are placed on the associated product detection instruments 3 is provided. Thereby, it can be determined whether the system is operating normally.

Next, a configuration of each device in the product management system 1 according to the one embodiment is described with reference to FIG. 4 and FIG. 5.

Figure 4:
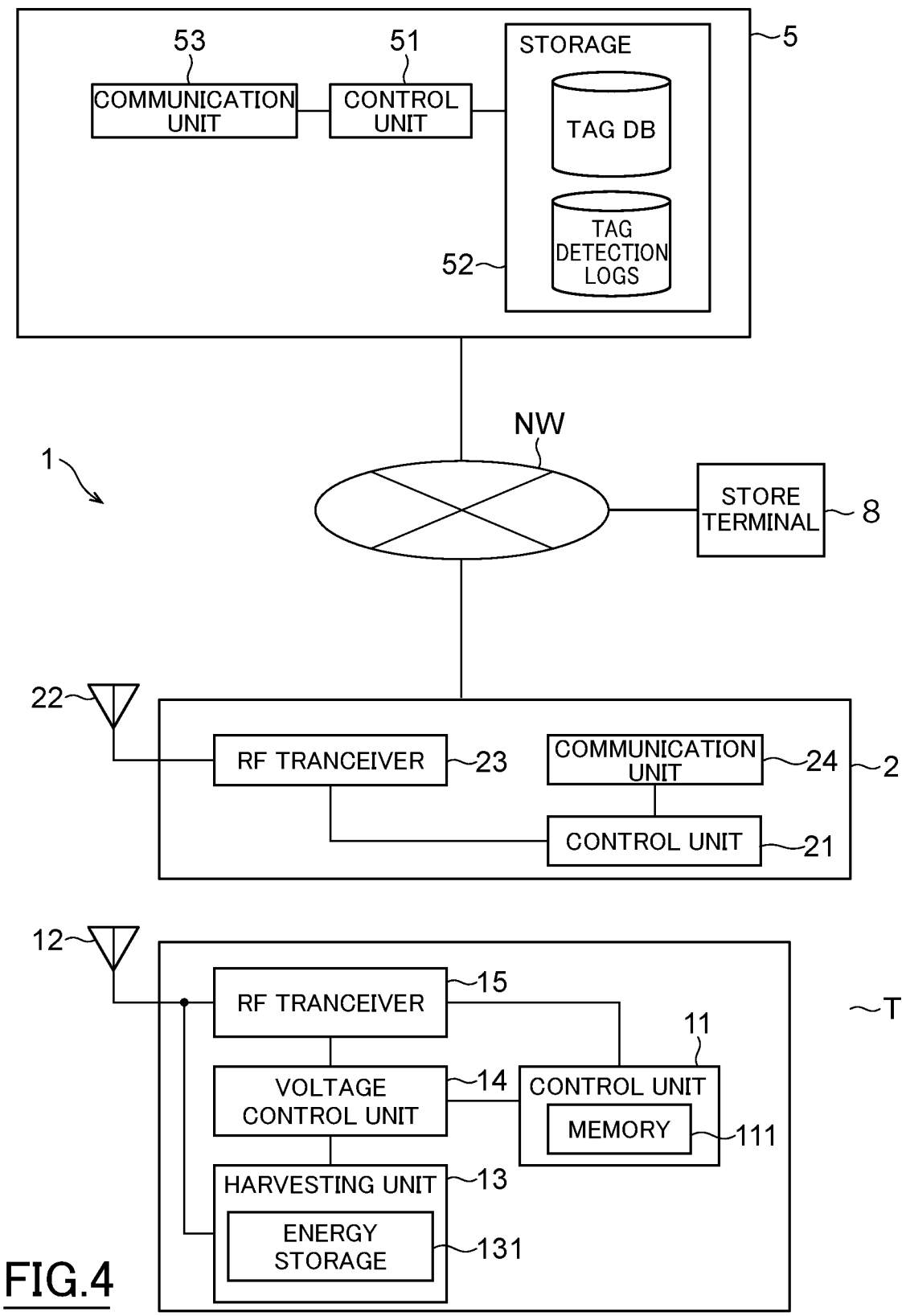
FIG. 4 is a block diagram illustrating an internal configuration of each device of the product management system according to the one embodiment

FIG. 4 is a block diagram illustrating an internal configuration of each device in the product management system 1 according to the present embodiment. FIG. 5 illustrates a configuration of an advertising packet transmitted from the tag T.

As illustrated in FIG. 4, the product management system 1 includes the wireless device 2 and the tag management server 5 (one example of a control device). The tag management server 5 can communicate with the wireless device 2 via the network NW. The network NW is, but not limited to, a local area network (LAN), a wide area network (WAN), a mobile communication network, the Internet, or the like, for example. The wireless device 2 and the tag management server 5 constitute the control device in the one embodiment.

The wireless device 2 functions as a BLE wireless terminal that receives packets from the tag T and the reference tag Tref by the BLE communication. When the wireless device 2 receives a packet from each of the tags, the wireless device 2 transmits the tag ID included in the received packet to the tag management server 5.

When the tag T and the reference tag Tref are in a state of being able to normally transmit packets, the tag T and the reference tag Tref each transmit a packet at a predetermined interval as described above. In response to this, the wireless device 2 also transmits the tag ID of each of the tags to the tag management server 5 at the predetermined interval.

Referring to FIG. 4, the tag T includes a control unit 11, an antenna 12, a harvesting unit 13, a voltage control unit 14, and an RF transceiver 15, for example. Although the following describes the configuration of the tag T, the configuration of the reference tag Tref, which is not illustrated in FIG. 4, is the same as that of the tag T.

An entire form of the tag, which is not illustrated, is a film-shaped member, for example. The film-shaped member includes an electrically conductive metal foil of a predetermined pattern constituting the antenna 12, and an IC chip connected to the metal foil. The control unit 11, the harvesting unit 13, the voltage control unit 14, and the RF transceiver 15 are mounted in the IC chip.

The control unit 11 includes a microprocessor and a memory 111. The control unit 11 controls the entire tag T. The memory 111 is a random-access memory (RAM) or a read-only memory (ROM). The memory 111 stores programs executed by the microprocessor, and stores the tag ID that is identification information unique to the tag T.

The harvesting unit 13 harvests electric power from radio waves (e.g., radio waves generated by the surrounding wireless communication) in the surrounding environment. The harvesting unit 13 stores the harvested electric power in an internal energy storage 131. In the present embodiment, the harvesting unit 13 converts, into a DC voltage, a radio signal received by the antenna 12 for example, and then stores the electric power in the energy storage 131. The energy storage 131 is a capacitor, for example. In the case of being the capacitor, the energy storage 131 may be one (i.e., an on-die capacitor) configured on a semiconductor chip.

Radio waves used by the harvesting unit 13 for energy harvesting are radio waves in a plurality of different frequency bands within a wide frequency band. Examples of such radio waves include radio waves generated by the wireless communication in the frequency bands used in mobile communication systems of what are called 3G to 5G and the like, radio waves generated by the wireless communication in the frequency bands used in the communication standards such as Bluetooth (registered trademark) and Wi-Fi (registered trademark), radio waves generated by the wireless communication in the 2.4-GHz band represented by the communication protocols such as ZigBee (registered trademark), Thread, and the like, and radio waves generated by the wireless communication in the frequency bands (e.g., the 900-MHz band and the 13.56-MHz band) used in the RFID.

Radio waves exemplified here are generally applicable in almost all areas. The tag T operates with electric power harvested from radio waves in the surrounding environment through energy harvesting by the harvesting unit 13. Thus, a battery does not need to be installed in the tag T, and the system cost can be reduced. No need to install a battery can eliminate work for battery replacement. Thus, there is no occurrence of a problem that the tag ID cannot be acquired even though the tag exists.

The voltage control unit 14 supplies an operation voltage to the control unit 11 and the RF transceiver 15. The voltage control unit 14 monitors a voltage of the energy storage 131, and switches a power mode, depending on the monitored result. When a voltage of the energy storage 131 is lower than a predetermined threshold value, the voltage control unit 14 sets the power mode to be a first mode of operating only the minimum circuitry. In this case, the control unit 11 and the RF transceiver 15 cease generation of a packet and transmission of a radio signal described below. When a voltage of the energy storage 131 becomes equal to or higher than the predetermined threshold value by charging the energy storage 131, the voltage control unit 14 sets the power mode to be a second mode of executing a normal processing routine. In this case, the control unit 11 and the RF transceiver 15 perform various pieces of processing including generation of a packet and transmission of a radio signal.

When the power mode is the second mode, the control unit 11 generates an advertising packet in accordance with the BLE protocol.

The advertising packet is a packet that is transmitted through advertising channels to implement broadcast communication in BLE. The advertising packet has the packet configuration illustrated in FIG. 5.

Figure 5:
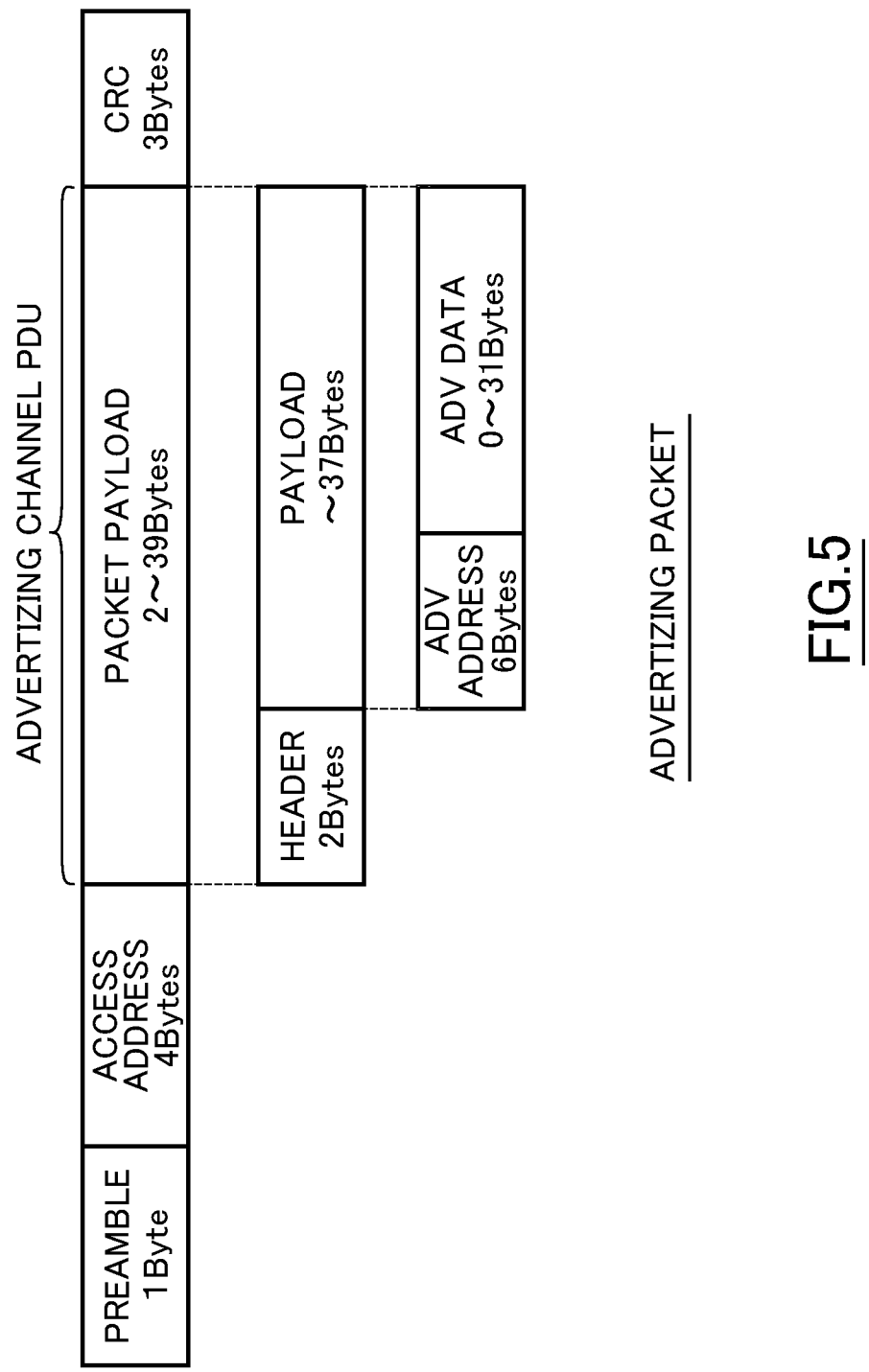
FIG. 5 illustrates a configuration of an advertising packet transmitted from an IoT tag.

In FIG. 5, the preamble and the address access are respective predetermined fixed values. The CRC is a cyclic check code, and is check data calculated by use of a predetermined generation polynomial targeting a packet payload (i.e., the advertising channel protocol data unit (PDU)).

The advertising channel PDU (hereinafter, referred to simply as "PDU") is constituted of a header and a payload. The payload is constituted of an ADV address and ADV data. The ADV address is an address of an advertiser (i.e., the tag T that is an entity making notification). However, the ADV address may be a random value set at each time of transmission to prevent the sender from being identified. The ADV data are data (broadcast data) of the advertiser, and include the tag ID.

The control unit 11 preferably encrypts the PDU. A method used for the encrypting is, but not limited to, for example, the advanced encryption standard (AES) whose key length is 128 bits.

The RF transceiver 15 applies predetermined digital modulation (e.g., the Gaussian frequency shift keying (GFSK)) to a transmission-target packet (baseband signal). Then, the RF transceiver 15 applies orthogonal modulation to the digital-modulated packet, and sends the high-frequency signal (a signal in the 2.4-GHz frequency band in a case of BLE) to the antenna 12.

The antenna 12 includes a transmission antenna and an electric power generation antenna. The transmission antenna transmits the high-frequency radio signal (packet) sent by the RF transceiver 15. Meanwhile, the electric power generation antenna receives radio waves in the surrounding environment for example to function as a rectenna in cooperation with the harvesting unit 13.

As illustrated in FIG. 4, the wireless device 2 includes a control unit 21, an antenna 22, an RF transceiver 23, and a communication unit 24.

The control unit 21 is constituted mainly by a microprocessor. The control unit 21 controls the entire wireless device 2. For example, the control unit 21 decrypts the PDU of a packet received from the tag T, and performs error detection, based on the CRC, by using the same generation polynomial as that on a side of the tag T. Then, the control unit 21 extracts the broadcast data from the PDU, and controls the communication unit 24 to transmit the extracted broadcast data to the tag management server 5.

The RF transceiver 23 demodulates the radio signal received by the antenna 22 from the tag T to convert the radio signal into the baseband signal. Then, the RF transceiver 23 applies predetermined digital demodulation to the baseband signal to receive the packet. In order to transmit a beacon signal from the antenna 22, the RF transceiver 23 applies orthogonal modulation to a baseband signal of a predetermined pattern, for example, and sends the orthogonal-modulated signal to the antenna 22.

The communication unit 24 functions as a communication interface for communicating with the tag management server 5.

As illustrated in FIG. 4, the tag management server 5 includes a control unit 51, a storage 52, and a communication unit 53, for example.

The control unit 51 is constituted mainly by a microprocessor. The control unit 51 controls the entire tag management server 5.

The storage 52 includes a large-scale storage device such as a hard disk drive (HDD). The storage 52 stores a tag database (tag DB). As illustrated in FIG. 6, the tag database includes, in association with each other, the tag ID of the tag T, a product code of the product placed on the product detection instrument 3 including the tag T, and information (position information) of a position at which the product is placed. The storage 52 also stores the tag ID of the reference tag Tref.

In the example illustrated in FIG. 1, the position information concerning each of the products and written in the tag database is one of A1, A2, B1, B2, C1, C2, D1, D2, El, and E2

The communication unit 53 functions as a communication interface for communicating with the wireless device 2 and a store terminal 8.

The control unit 51 executes a server program. Thereby, when the wireless device 2 receives packets transmitted by the respective tags T and the reference tag Tref and including the tag IDs, the control unit 51 acquires, from the wireless device 2, the tag IDs included in the packets.

In the one embodiment, each time the control unit 51 acquires the tag ID of the reference tag Tref from the wireless device 2, the control unit 51 records, in the storage 52, as a tag detection log, the acquired tag ID and a time point at which the control unit 51 acquires the tag ID. As illustrated in FIG. 1, the reference tag Tref is not shielded. Thus, unless the wireless device 2 is malfunctioning, the control unit 51 can acquire the tag ID of the reference tag Tref at the predetermined interval at which the reference tag Tref transmits a packet. When the control unit 51 cannot acquire the tag ID of the reference tag Tref at the predetermined interval, the control unit 51 determines that the wireless device 2 is malfunctioning, and notifies the store terminal 8 of the determined result.

Each time the control unit 51 acquires the tag ID of any of the tags T from the wireless device 2, the control unit 51 refers to the tag database, thereby identifies the product code and the position information that are associated with the acquired tag ID, generates an image indicating the identified result, and transmits the generated image to the store terminal 8 (one example of a display device). The result that the tag ID has been acquired indicates that the product of the product code associated with the tag ID is not placed on the product detection instrument 3 associated with the tag ID. Accordingly, for example, the product codes and the position information that are identified by the control unit 51 correspond to information as to whether the products exist at the respective positions in the matrix when a plurality of the product detection instruments 3 are arranged in the matrix as illustrated in FIG. 1.

The control unit 51 may determine whether the product is placed on the product detection instrument 3, based on a frequency at which the tag T transmits a signal (packet). When the product placed on the product detection instrument 3 causes the tag T to approach the metal-deposited sheet NP but does not cause the product to sufficiently contact with the metal-deposited sheet NP, there is a case where radio waves emitted from the tag T are not completely shielded, and as a result, the wireless device 2 receives the signal from the tag T. In this case, the tag T emits a signal less frequently, and thus, the wireless device 2 receives the signal from the tag T less frequently. In view of it, when the tag T emits a signal less frequently, and as a result, a frequency at which the control unit 5 acquires the tag ID from the wireless device 2 is smaller than a predetermined threshold value, the control unit 51 determines that the product is placed on the associated product detection instrument 3.

The store terminal 8 is an information processing terminal possessed by a store staff in charge and able to communicate with the tag management server 5. Examples of the store terminal 8 include a personal computer (PC), a tablet terminal, a smartphone, and the like.

The store terminal 8 displays the information (e.g., the information indicating that the wireless device 2 is malfunctioning) notified by the tag management server 5, and the image transmitted from the tag management server 5. While described below with reference to an example, the image transmitted from the tag management server 5 is, for example, an image indicating presence or absence of each of a plurality of the products arranged in the matrix.

The store terminal 8 and the tag management server 5 communicate with each other by using the HTTPS, for example, but the communication protocol is not particularly limited. A browser of the store terminal 8 displays a web page including the image sent from the tag management server 5.

Figure 7:
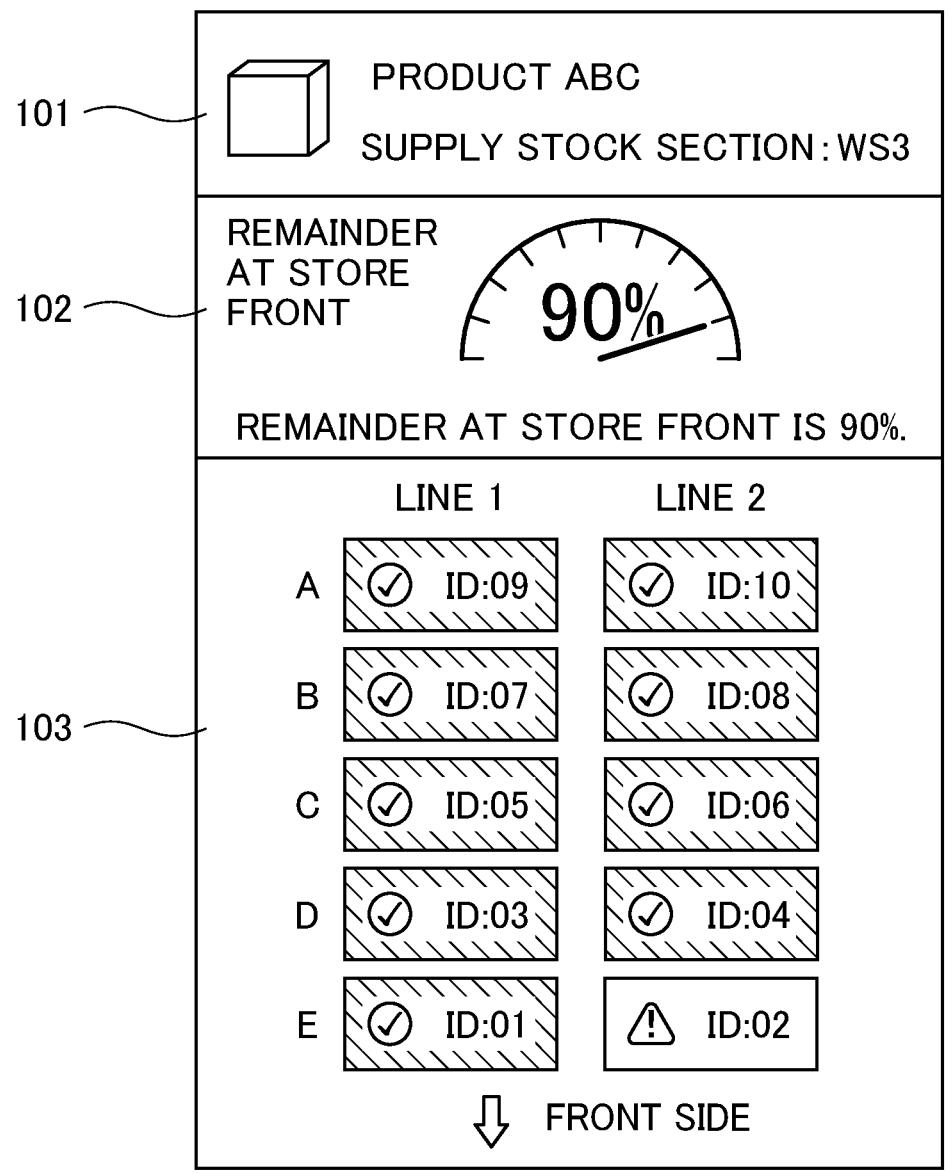
FIG. 7 illustrates one example of a screen image displayed on a store terminal.

FIG. 7 illustrates one example of the image displayed on the store terminal 8. This image concerns the case where a plurality of the products are arranged in the 2×5 matrix as illustrated in FIG. 1.

The image illustrated in FIG. 7 is constituted of an upper part 101, an intermediate part 102, and a lower part 103. The upper part 101 represents a product name (e.g., ABC) and position information (e.g., WS3) of a location (a supply stock section) of stock of products for supply. The intermediate part 102 represents information (e.g., 90%) indicating a percentage of unsold products among the products available at the store front. The intermediate part 102 may include a message (e.g., text of "remainder at store front is 90%.") depending on the percentage.

The lower part 103 represents, in a visually recognizable manner, information as to whether the products are placed at the respective positions of the product detection instruments 3 arranged in the 2×5 matrix. The example illustrated in the drawing represents a plurality of rectangles (rectangles arranged in the lines 1 and 2 and in the rows A to E) arranged in the matrix. The rectangles imitate the arrangement layout of the products at the store front. The example illustrated in the drawing also represents the tag ID in each of the rectangles. Further, the example illustrated in the drawing represents each of the rectangles, in a representing mode that depends on whether the product exists at the associated position. Thereby, the store staff in charge who views the store terminal 8 can immediately recognize presence or absence of the product at each position, concerning the products of the product name ABC.

The example illustrated in FIG. 7 represents a state where the product at the position E2 has been sold and does not exist, and the other products remain unsold and still exist. Accordingly, the intermediate part 102 represents, as 90% (=9/10), a percentage of the remainder at the store front. The store staff in charge can easily recognize a stock state of the products at the store front even when just one product is lacking as in the example.

Figure 8:
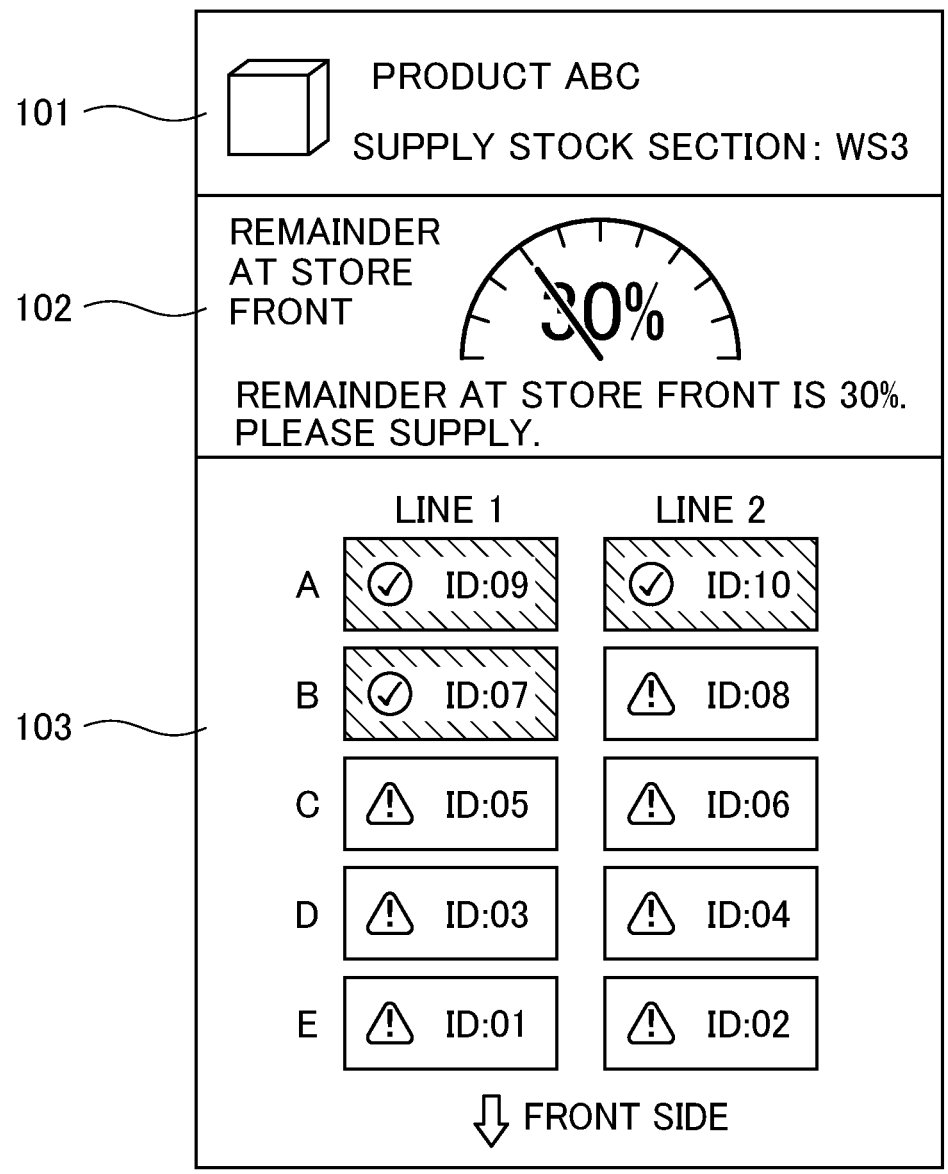
FIG. 8 illustrates one example of a screen image displayed on the store terminal.

FIG. 8 illustrates another example of the image displayed on the store terminal 8.

Similarly to FIG. 7, the image illustrated in FIG. 8 represents whether the products are placed at the respective positions of the product detection instruments 3 arranged in the 2×5 matrix. However, the image illustrated in FIG. 8 differs from that of FIG. 7 in a state of the remaining products. FIG. 8 illustrates a state where the products have been further sold from the state illustrated in FIG. 7.

The lower part 103 in the example illustrated in FIG. 8 represents the state where the products at the positions A1, A2, and B1 remain unsold and still exist, and the other products have been sold and do not exist. Accordingly, the intermediate part 102 represents, as 30% (=3/10), a percentage of a remainder at the store front. In this case, the intermediate part 102 may include a message (e.g., text of "remainder at store front is 30%. Please supply") depending on the percentage.

Figure 9:
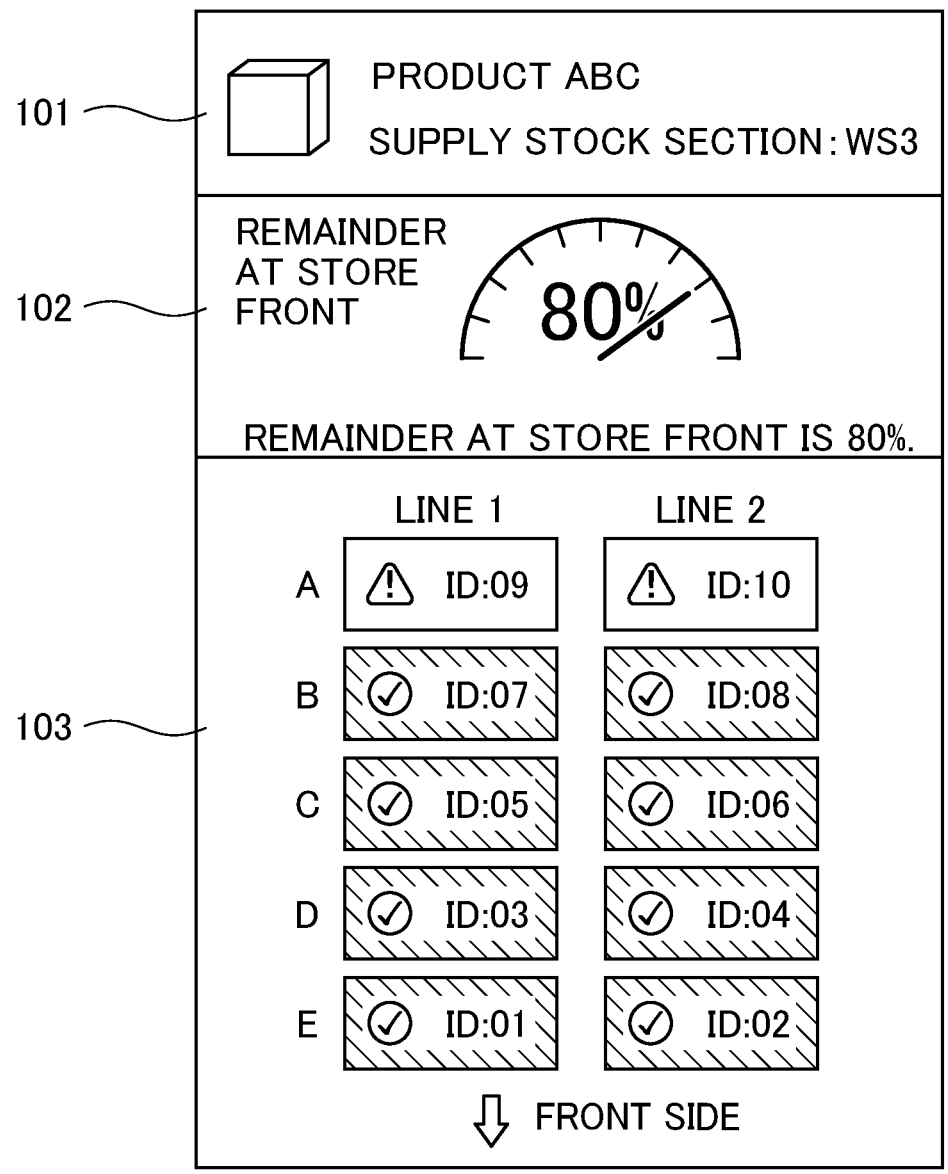
FIG. 9 illustrates one example of a screen image displayed on the store terminal.

FIG. 9 illustrates still another example of the image displayed on the store terminal 8.

Similarly to FIG. 7, the image illustrated in FIG. 9 represents whether the products are placed at the respective positions of the product detection instruments 3 arranged in the 2×5 matrix. However, the image illustrated in FIG. 9 differs from that of FIG. 7 in a state of the remaining products.

The lower part 103 in the example illustrated in FIG. 9 represents a state where the products at the positions Al and A2 have been sold and do not exist, and the other products remain unsold and still exist. Accordingly, the intermediate part 102 represents, as 80% (=8/10), a percentage of a remainder at the store front.

In the state illustrated in FIG. 9, the two products that are at the back when viewed from a front side are lacking. In such a state, when a store staff in charge visually checks a state of the products from the front passage, there is a possibility that the staff might miss shortage of the two products at the back. However, with the visual displaying as illustrated in FIG. 9, shortage of the two products at the back becomes apparent at a glance.

Although FIG. 1 illustrates the example in which the product detection instruments 3 are arranged in the 2×5 matrix, one of a resin sheet, a film, and a cloth each having flexibility may be used to cover the product detection instruments 3 from an upper side. The covering by the resin sheet or the like reduces unevenness and facilitates smooth taking-out and supplying of the products P.

As described above, in the above-described product management system 1, the product detection instrument 3 is configured in such a way that, when the product is placed on the product detection instrument 3, a weight of the product causes a position of the tag T to be displaced downward in the vertical direction, and thus, the tag T comes into contact with the metal-deposited sheet NP, and thereby, the tag T becomes unable to emit radio waves. The tag management server 5 acquires, from the wireless device 2, a result of whether the wireless device 2 has received a signal from the tag T. Based on the result, the tag management server 5 determines whether the product is placed on the product detection instrument 3. When a plurality of the products are placed, the respective products are placed on a plurality of the respective product detection instruments 3, and presence or absence of each of the products is displayed. Thereby, a store staff in charge can recognize not only the number of the existing products but also the position of each of the products that remain unsold and still exist.

Thus, according to the product management system 1, a store staff in charge can recognize the number of the existing products and the positions to which the products are to be supplied, even without visual checking, and can appropriately supply the products and order the products. Particularly, the positions (positions at each of which the product is not placed on the product detection instrument 3) to which the products are to be supplied can be accurately recognized. Accordingly, work of supplying the products becomes easier. The positions of the products that remain unsold and still exist can be recognized. Accordingly, when a plurality of the products are arranged in a matrix, appropriate product arrangement work can be made at an appropriate timing. The appropriate product arrangement work is, for example, work of moving the existing unsold products to the positions where the products are more likely to catch the eyes of customers.

The product management method (one example of an item management method) according to one embodiment includes the following steps (1) to (3).

(1) The step of arranging the product detection instrument 3 that includes the placement member 32, the elastic member 33, the tag T, and the metal-deposited sheet NP. The placement member 32 is provided for placing the product P. The elastic member 33 is configured to bend in the vertical direction when the product P is placed on the placement member 32. The tag T is provided on a vertical-direction lower side of the elastic member 33. The metal-deposited sheet NP is provided on a vertical-direction lower side of the tag T.

(2) The step of acquiring a result of whether communication by the wireless device 2 with the tag T is possible.

(3) The step of determining whether or not the product P is placed on the placement member 32, based on the result of whether the communication is possible.

Further, the product management method according to one embodiment includes the following steps (4) to (7).

(4) The step of arranging the product management device 4.

(5) The step of acquiring a result of whether communication by the wireless device 2 with the tag T is possible, for each of a plurality of the product detection instruments 3 included in the product management device 4.

(6) The step of determining whether the item is placed on the product detection instrument 3, for each of the product detection instruments 3, based on the result of whether the communication is possible.

(7) The step of referring to the tag database, for position information of the arrangement position of each of a plurality of the product detection instruments 3, and thereby displaying information of whether the product is placed on the product detection instrument 3 for each of a plurality of the product detection instruments 3, on the store terminal 8, in a matrix to be associated with the position information of a plurality of the product detection instruments 3.

Although the embodiments of the article management system, the article management method, the article detection instrument, and the article detection device according to the present invention are described above, the present invention is not limited to the above-described embodiments. The above-described embodiments can be variously improved or modified within a range that does not depart from the essence of the present invention.

The present invention is related to the patent application of Japanese Patent Application No. 2022-30367 filed with the Japan Patent Office on Feb. 28, 2022, the entire contents of which are incorporated by reference into the description of the present application.

The invention claimed is:

1. An item management system comprising:
 a placement member for placing an item, the placement member being at a first position when no item is placed on the placement member, the placement member moving from the first position to a second position when an item is placed on the placement member;
 a communication device attached to the placement member;
 a radio wave shield member configured to shield radio waves emitted from the communication device when the radio wave shield member is close to the communication device;
 a wireless device wirelessly communicating with the communication device; and
 a control device that acquires a result of whether communication by the wireless device with the communication device is possible, and determines whether the item is placed on the placement member, based on the result of whether the communication is possible, wherein
 when the placement member is at the first position, the communication device is separated from the radio wave shield member, and when the placement member is at the second position, the communication device is close to the radio wave shield member.

2. The item management system according to claim 1, wherein
 the control device determines whether the item is placed on the placement member, based on a frequency at which the communication device transmits a signal.

3. The item management system according to claim 1, further comprising:
 a reference communication device arranged at a position that is not close to the radio wave shield member regardless of whether an item is placed on the placement member, wherein
 the wireless device communicates with the reference communication device, and
 the control device acquires a result of whether communication by the wireless device with the reference communication device is possible.

4. The item management system according to claim 1, wherein
 the communication device is a wireless tag that collects surrounding radio waves and converts the collected radio waves into electric power, the wireless tag including a capacitor that stores the electric power.

5. The item management system according to claim 1, wherein
 the communication device is a UHF-band wireless tag.

6. The item management system according to claim 1, wherein
 the communication device is an HF-band wireless tag.

7. The item management system according to claim 1, wherein
 the communication device is a microwave-band wireless tag.

8. The item management system according to claim 1, further comprising:
 an elastic member attached to the placement member, the elastic member biasing the placement member in a direction from the second position toward the first position when the placement member is at the second position.

9. The item management system according to claim 8, wherein the elastic member is a leaf spring.

10. The item management system according to claim 8, wherein the elastic member is a coil spring.

11. The item management system according to claim 1, further comprising:
 a cushion arranged at a position shifted from the radio wave shield member in a first direction, wherein the first direction is defined as a direction in which the placement member moves from the first position to the second position.

12. The item management system according to claim 1, wherein
 the radio wave shield member is a sheet member including a metal coating.

13. An item management method comprising:
 arranging an item detection instrument that includes a placement member, a communication device, and a radio wave shield member, the placement member being provided for placing an item and movable between a first position and a second position, a communication device being attached to the placement member, the radio wave shield member being configured to shield radio waves emitted from the communication device when the radio wave shield member is close to the communication device;
 causing the placement member to be at a first position with no item placed on the placement member, resulting in the communication device being separated from the radio wave shield member, and thereby allowing a wireless device to communicate with the communication device;
 causing the placement member to move to the second position with an item placed on the placement member, and resulting in the communication device being close to the radio wave shield member;
 acquiring a result of whether communication by the wireless device with the communication device is possible; and
 determining whether the item is placed on the placement member, based on the result of whether the communication is possible.

14. An item detection instrument for detecting an item, comprising:

a placement member for placing an item, the placement member being at a first position when no item is placed on the placement member, the placement member moving from the first position to a second position when an item is placed on the placement member;

a communication device attached to the placement member; and a radio wave shield member configured to shield radio waves emitted from the communication device when the radio wave shield member is close to the communication device, wherein when the placement member is at the first position, the communication device is separated from the radio wave shield member, and when the placement member is at the second position, the communication device is close to the radio wave shield member.

15. An item detection device comprising a plurality of item detection instruments arranged in a matrix and each provided for detecting an item, the plurality of item detection instruments each including:

a placement member for placing an item, the placement member being at a first position when no item is placed on the placement member, the placement member moving from the first position to a second position when an item is placed on the placement member;

a communication device attached to the placement member; and a radio wave shield member configured to shield radio waves emitted from the communication device when the radio wave shield member is close to the communication device, wherein when the placement member is at the first position, the communication device is separated from the radio wave shield member, and when the placement member is at the second position, the communication device is close to the radio wave shield member.

16. An item management method comprising:

arranging the item detection device according to claim 15;

acquiring a result of whether communication by a wireless device with the communication device, for each of the plurality of item detection instruments included in the item detection device;

determining whether an item is placed on the item detection instrument, for each of the plurality of item detection instruments, based on the result of whether the communication is possible; and with reference to position information of where each of the plurality of item detection instruments is arranged, displaying information of whether an item is placed on the item detection instrument for each of the plurality of item detection instruments, on a display device, in a matrix to be associated with the position information of the plurality of item detection instruments.

* * * * *